United States Patent [19]

Nanba

[11] Patent Number: 4,457,190
[45] Date of Patent: Jul. 3, 1984

[54] METHOD AND APPARATUS FOR PROFILE-FORMING SAW TEETH

[75] Inventor: Taro Nanba, Sanjo, Japan

[73] Assignee: Yugenkaisha Nakaya Nokogirikikai Seisakusho, Niigata, Japan

[21] Appl. No.: 382,179

[22] Filed: May 26, 1982

[30] Foreign Application Priority Data

May 29, 1981 [JP] Japan .................................. 56-82385

[51] Int. Cl.³ ............................................ B23D 63/12
[52] U.S. Cl. ........................................ 76/43; 76/112
[58] Field of Search .................... 76/37, 39, 43, 75, 76, 76/77, 44, 112

[56] References Cited

U.S. PATENT DOCUMENTS 4,299,143 11/1981 Nanba ...................................... 76/43

FOREIGN PATENT DOCUMENTS 4612477 4/1971 Japan.
49148844 7/1976 Japan.

Primary Examiner—Roscoe V. Parker
Attorney, Agent, or Firm—John E. Reilly

[57] ABSTRACT

An apparatus for profile-forming saw teeth, a carriage to which a saw blade to be toothed is affixed for feeding longitudinally and transversely with respect to a cutter blade. The carriage is horizontally rotatable about a cutting position of a cutter blade as a center of rotation and a tooth angle changing mechanism gradually moves the carriage to a predetermined angle at feed positions according to the timing of the longitudinal and transverse feed mechanism, thereby shaping saw teeth.

3 Claims, 5 Drawing Figures

METHOD AND APPARATUS FOR PROFILE-FORMING SAW TEETH

This invention relates to profile-forming saw teeth; and more particularly relates to a novel and improved method and apparatus for automatically or mechanically profile-forming saw teeth on a saw blade.

BACKGROUND AND FIELD OF INVENTION

In my U.S. Pat. No. 4,299,143, entitled "Apparatus for Automatically Profile-Forming Saw Teeth", there is disclosed an apparatus which feeds a saw blade, automatically and positively, for profile-forming of saw teeth. That is, in this apparatus, a carriage is fed longitudinally for engagement with a positioning claw which is engaged with a template or a saw blade used as a pattern and, upon determining the longitudinal feed accurately in relation with the template or saw blade, the carriage is stopped by a brake mechanism and fed transversely toward a cutter by means of a transverse feed cam to cut new saw teeth or recut teeth on an existing saw blade. As a result, even in cutting teeth for a rip saw whose longitudinal pitches are changed gradually, positive feed can be achieved in accordance with the template or existing saw blade. Furthermore, this apparatus includes a mechanism capable of cutting in either direction so as to cut both front and back teeth for a crosscut saw.

However, in the apparatus of my hereinbefore-mentioned patent, and in conventional forming of saw teeth by mechanical press, it is impossible to form mechanical saw teeth with truly high cutting ability since the saw tooth forming angle must be constant. Therefore, to produce saw teeth with truly high cutting ability, manual forming is essential. Only by manual forming, a saw blade whose tooth angles can be increased gradually from a minimum on the hand-held side to a maximum on the opposite side, can be produced. This method of forming results in time-consuming steps and high costs, thereby prohibiting mass production.

SUMMARY OF THE INVENTION

It is therefore a principal feature of the present invention to provide for a novel and improved apparatus for profile-forming saw teeth whose tooth angles may undergo a predetermined change along the length of a saw blade.

A further object of the present invention is to provide for a method and apparatus for automatically and mechanically producing a saw blade whose tooth cutting angles are gradually changed from a minimum at the hand-held end to a maximum at the top end.

Another object of the present invention is to provide for a novel and improved method and apparatus for mass production of a saw blade having precise cutting ability at low cost.

It is a further object of the present invention to provide for a novel and improved apparatus for producing neatly cut saw blades capable of creating decorated boards, parquet plywood, etc. without burrs at the cutting edges thereof, suitable for mass production.

Yet another object of the present invention is to provide for a novel and improved apparatus to profile-form or tooth both crosscut saws and rip saws, as well as Japanese saws and Western saws.

In accordance with the present invention, an apparatus for profile-forming saw teeth has been devised in which a carriage on which a saw blade to be toothed is fixed to be fed longitudinally and transversely with respect to a cutter blade. The apparatus includes a carriage which is rotatable horizontally about a cutting position of the cutter blade as a center of rotation and a tooth angle changing mechanism which gradually moves the carriage to a predetermined angle at each feed position according to the timing of the longitudinal and transverse feed mechanism, thereby shaping saw teeth whose cutting angles are gradually changed from the hand-held end to the top end of the saw blade. It will be evident that the apparatus according to the present invention can produce a saw blade, either automatically or mechanically, whose tooth cutting angles gradually increase from a minimum at the hand-held end to a maximum at the tip end. Mass production of a saw blade in accordance with the present method and apparatus having precise cutting ability can be achieved at an economically feasible cost. In particular, the apparatus of the present invention is capable of producing a saw blade for cutting decorative boards, parquet designs, etc. with smooth or burr-free cutting edges. The apparatus of the present invention is also capable of profile-forming or toothing both crosscut saws and rip saws, as well as Japanese saws (illustrated in FIG. 1) and Western saws, wherein the cutting angle is reversed. It will be apparent that the present invention overcomes technical difficulties in the state of the art which have heretofore remained unsolved.

The above and other objects, advantages and features of the present invention will become more readily understood and appreciated from a consideration of the following detailed description of a preferred embodiment when taken together with the accompanying drawings in which:

DETAILED DESCRIPTION OF THE PREFERRED EMBODIMENT

Figure 3:
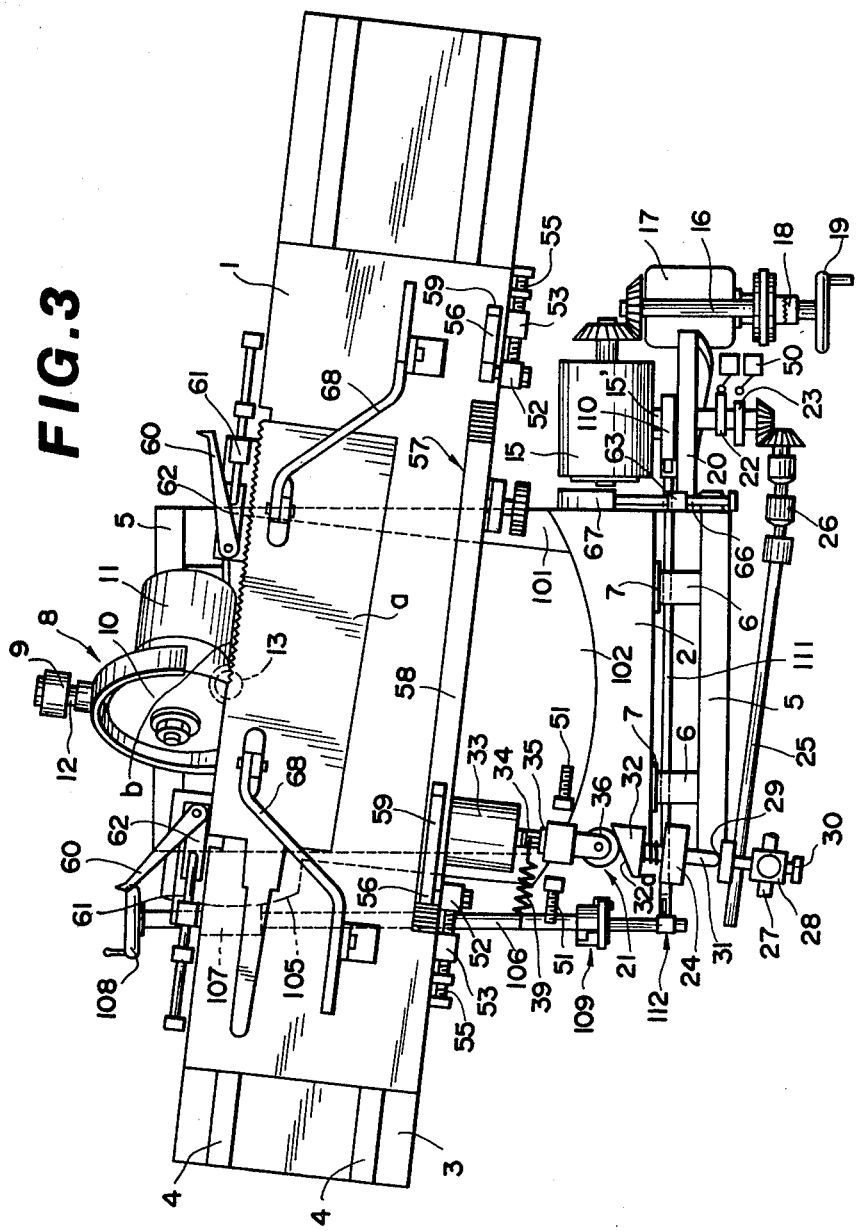
FIG. 3 is a top view of the preferred form of apparatus shown in FIG. 2.

Referring in detail to the attached drawings, in a preferred embodiment of the present invention a carriage 1 firmly secures a saw blade a to be toothed and is rotatable horizontally with respect to a transverse feed block 2. The carriage 1 is slidable in a longitudinal direction along guide rails 4 provided on a guide block 3, which is also rotatable horizontally. Holders 7 are securely fixed to the transverse feed block 2 and are slidably mounted on guide rods 6. The guide rods 6 are extended horizontally and transversely in a frame 5, as shown in FIG. 3. A cutter section 8 is provided on one side of the carriage 1. A support 9 is extended from the frame 5 in order to support a rod or drive shaft 12 projecting from a motor 11 which drives a cutter blade 10 in such a manner that the cutter blade 10 is positioned in transverse relation to the frame 5. The shaft 12 can be fixed at different angles with respect to the support 9 so that the cutter blade 10 can be angled to the surface of the carriage 1. The transverse feed block 2 and the guide block 3 are rotatable horizontally about a shaft 13 so that the carriage 1 can be angled to cutting blade 10.

Figures 1, 2:
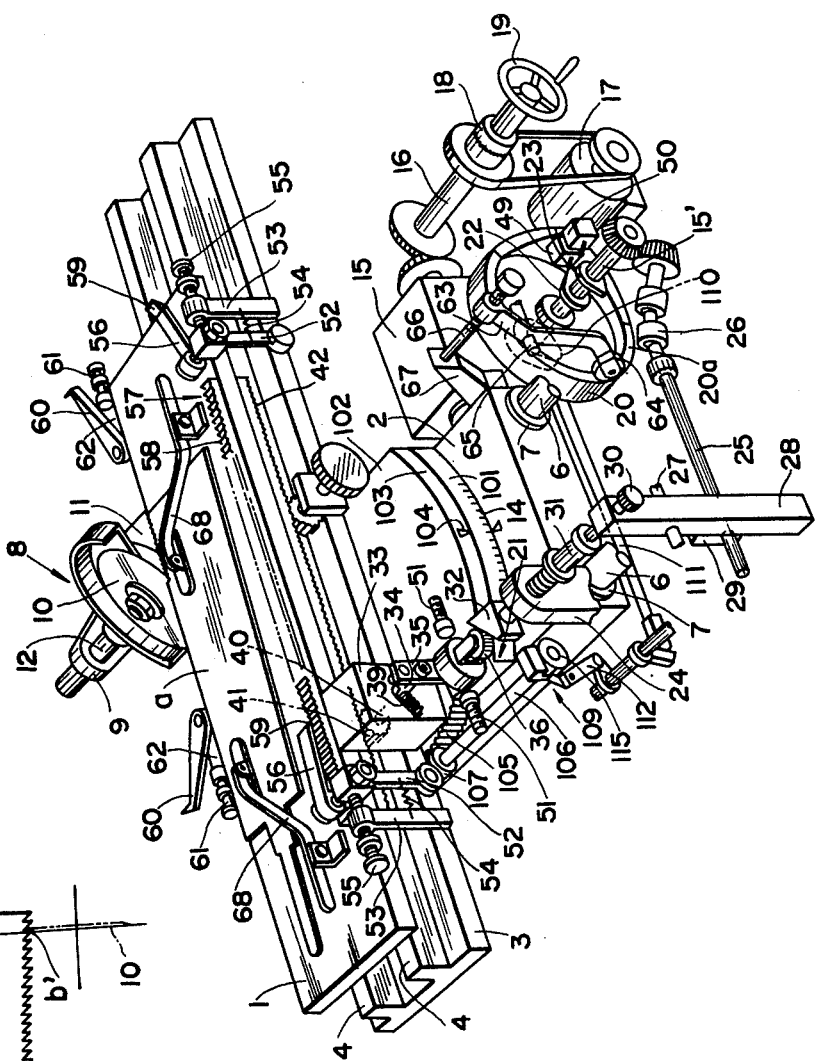
FIG. 1 is a perspective view of the preferred embodiment of profile-forming of saw teeth in accordance with the present invention.
FIG. 2 is a partial cut-away view in perspective of the present invention.
Figure 4:
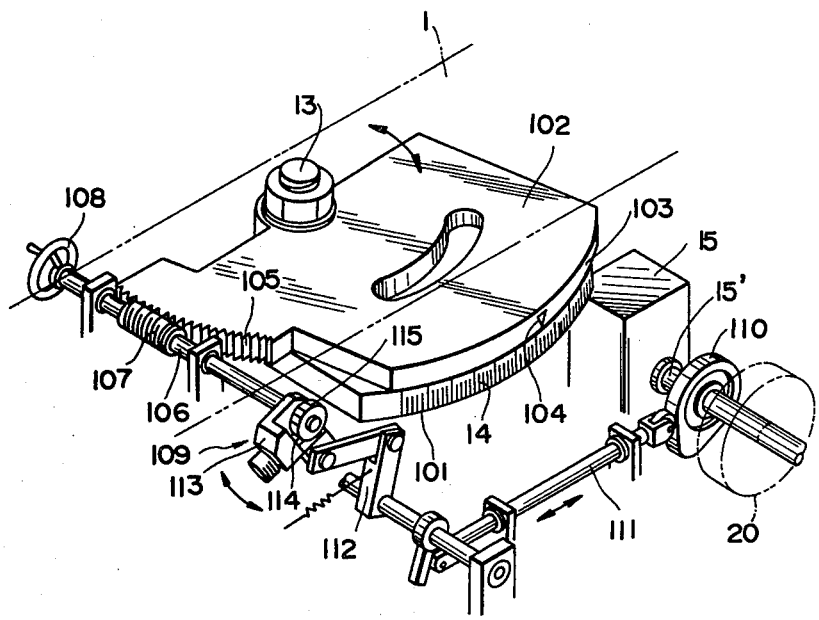
FIG. 4 is a perspective view in detail of the key components of the preferred form of apparatus shown in FIG. 2.

As shown in FIGS. 2 and 3, block 101, which is an automatic saw tooth changing mechanism and a key feature of the present invention, is provided between the transverse feed block 3 and the guide block 4 and is rotatable horizontally within a predetermined range about the shaft 13 to locate a cutting position of cutter blade 10 with respect to the transverse feed block 2. An angle graduation 14 is marked on an arc-formed portion of the block 101. There is provided on block 101, a block 102 which is secured to the bottom of guide block 3 and rotatable horizontally about the shaft 13. Block 102 has a reference pointer 104 marked on the arc-formed side 103 thereof facing the angle of graduation 14, and has an arc-formed worm rack 105 whose center of curvature is at the shaft 13 on one side thereof. The worm rack 105 is enmeshed with a worm gear 107 mounted on a shaft 106 which is rotatable in a bracket extended from one side of block 101. The shaft 106 is provided with an angle adjusting handwheel 108 at one end thereof and a ratchet mechanism 109 at its other end. The ratchet mechanism 109 urges a lever mechanism 112 into contact with one end of a connecting rod 111 which is connected at its other end with an angle changing cam 110 mounted on an output shaft 15' of a reduction gear box 15 which will be described hereinafter. Furthermore, by swinging movement of a lever mechanism 112, a drive arm 113, shown in FIG. 4, is rotatable in a reciprocating movement so that a feed claw 114 rotatably mounted on the drive arm 113 is enmeshed with the ratchet gear 115 in only one rotational direction of the drive arm 113 in order to rotate the worm gear 107 intermittently. Therefore, the movement of the worm rack 105 enmeshed with worm gear 107 causes the rotation of block 102 about shaft 13. In other words, a rotational feed of block 102 can be adjusted by replacing the ratchet gear 115 with another ratchet gear having a different number of teeth because its engaging pitch with the feed claw 114 is changed. The replacement of ratchet gear 115, for example, is required when the length of the saw blade does not correspond to the number of teeth.

On one side of frame 5 is fixed reduction gear box 15 whose input shaft is provided with a bevel gear which is enmeshed with a bevel gear on a drive shaft 16. A pulley mounted on the drive shaft 16 is engaged with a pulley of motor 17 through a V-belt. At one end of drive shaft 16, a handwheel and clutch 18 are provided. On the other hand, an output shaft 15' of gear reduction box 15 is provided with a transverse feed cam 20 as well as timing cams 22, 23 for a longitudinal feed mechanism 21 which will be described in more detail hereinafter. A bevel gear fixed at an end of output shaft 15' is enmeshed with a bevel gear mounted at an end of a shaft 25 of longitudinal feed mechanism 21 supported by a bracket 24 fixed on guide block 3, and shaft 25 is provided with a flexible joint 26.

The longitudinal feed mechanism 21 is secured by a bracket 24 mounted on guide block 3. A lever 28 pivots about shaft 27 and acts as a fulcrum at one end of bracket 24. A lower end of lever 28 is in contact with a longitudinal feed cam 29 mounted on and rotated together with shaft 25. Furthermore, an upper end of lever 28 is connected to a connecting rod 31 through an adjusting screw 30 so as to press against connecting rod 31. In addition, connecting rod 31 is supported by and spring-loaded against bracket 24. A flat right-angled cam member 32 is provided at one end of connecting rod 31. Cam member 32 has a slope face 32a and is reciprocal and reversible in a horizontal direction. An input shaft 34 of a clutch/brake mechanism 33 is forced by tension coil spring 39 in the manner disclosed in my prior U.S. Pat. No. 4,299,143 so that a roller 36 is urged into contact with slope face 32a of the cam member 32. Furthermore, a pinion 41 mounted on an output shaft 40 of the clutch/brake mechanism 33 is enmeshed with the rack 42 which is attached to the underside of carriage 1.

Figure 5:
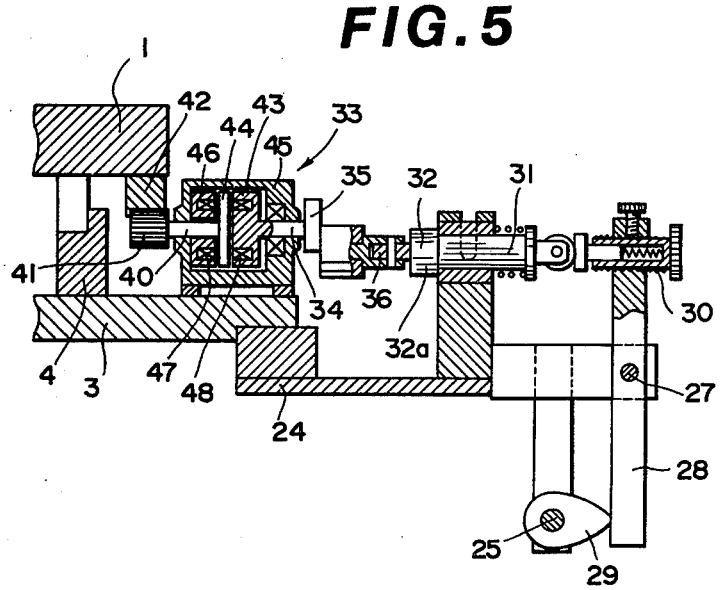
FIG. 5 is a sectional view of the key components of the preferred form of apparatus shown in FIG. 2.

As shown in FIG. 5, the clutch/brake mechanism 33 also includes a clutch disc 43 provided at one end of input shaft 34, a magnet clutch disc 44 provided at one end of input shaft 34, a magnet clutch disc 44 provided at one end of output shaft 40 and facing clutch disc 43, and a brake disc 46 fixed to a housing 45. Moreover, electromotive coils 47 and 48 are provided in brake disc 46 and clutch disc 43, respectively. As a result, output shaft 40 can be engaged or disengaged with input shaft 34 or braked or stopped by limit switches 49 and 50, which are turned on or off by timing cams 22, 23. Adjusting screws 51 determine or limit the lateral movement of the roller 36.

Referring to FIGS. 2 and 3, swinging levers 52 are provided at both ends of guide block 3 and connected to adjacent fixed supporting rods 53 through tension coil springs 54 and adjusting screws 55 so that tilting of the swing levers about lower pivotal ends can be freely adjusted. Positioning members 56 rotatably attached to upper ends of swinging levers 52 are engageable with a template 57 fixedly attached on carriage 1 in such a manner that claws 59 at the distal ends of positioning members 56 are enmeshed with teeth 58 of template 57. Another pair of positioning members 60 are rotatably attached to top ends of supporting rods 62 which are adjustable in the sliding direction of carriage 1 and are supported on brackets 61 projecting from one side of guide block 3. As a result, the positioning members 60 can be engaged with teeth of a saw blade set on carriage 1.

A lever 63 is rotatably supported by a shaft 65 extending from frame 5. A roller 64 is provided at the lower end of the lever 63. Roller 64 is in contact with a cam face 20a of transverse feed cam 20. The upper end of lever 63 is in contact with a part 67 projected from the transverse feed block 2 via an adjusting screw 66 so as to urge the transverse feed block 2 in a direction toward the cutter blade 10. The feed block 2 may be returned by the force of a spring. Retaining bars 68 pivotally mounted on the upper surface and at opposite ends of carriage 1 serve to securely hold a saw blade in position on carriage 1.

Operation of the method and means according to the present invention will be described in the following sequence of steps: (1) Adjust a horizontal cutting angle with reference to the angle graduation 14 on the guide block 3 which indicates a horizontal angle between the transverse feed block 2 and the guide block 3; (2) adjust the cutting plane angle by turning the rod 12 of the cutter blade 10; (3) exchange the cutter blade 10 with a proper one; (4) set the template 57; (5) set one of the positioning members 56 or 60; and (6) determine a setting direction for the cam member 32 of the longitudinal feed mechanism 21 and the movable hook 38. A saw blade a is retained in place on the carriage 1 by means of retaining bars 68 so that its edge to be cut is projected toward the cutter blade 10 from the side of carriage 1. Longitudinal feed of the saw blade a is made in the same manner in any teeth cutting, such as, leading tooth, back tooth or subsequent tooth or the front and rear tooth of a crosscut saw as well as the teeth of a rip saw.

In FIG. 2, in cutting teeth by using template 57, the left positioning member 56 is engaged with teeth 58 on the upper surface of template 57. After starting the cutting blade driving motor 11, feed mechanism drive motor 17 is started, and transverse feed cam 20 and timing cams 22, 23, all being mounted on the output shaft of gear reduction box 15, are rotated through reduction gear box 15. The transverse feed block 2 is fed by the movement of the cam face 20a of transverse feed cam 20 through lever 63 to urge the saw blade a fixed on carriage 1 against cutter blade 10. At the same time, the output shaft of reduction gear box 15 makes the longitudinal feed cam 29 rotate through the bevel gears and flexible joint 26. By rotation of the longitudinal feed cam 29, the lever 28 swings and intermittently presses the end of connecting rod 31, thus causing the reciprocating movement of member 32. As a result, the roller 36 which is pressed against the slope face 32a of cam member 32 is forced to move along slope face 32a. Accordingly, the input shaft 34 of clutch/brake mechanism 33 starts to reciprocate with the aid of coil spring 39. This reciprocal movement is converted to intermittent rotation through the clutch mechanism. Furthermore, the intermittent rotation is converted to intermittent longitudinal feed of carriage 1 through the pinion 41 mounted on the output shaft 40 and rack 42 provided under carriage 1.

The clutch/brake mechanism 33 controls the clutch disc 43 and brake disc 46 by limit switches 49, 50 so as to convert its swinging movement to intermittent rotational movement and can brake or lock the carriage 1. The swing member or plate 36 is swung by the slope face 32a and finally presses one of the adjusting screws 51 against its coil spring. At this time, since the clutch is engaged, the pinion 41 revolves and carriage 1 moves with the rack 42 in a longitudinal direction. Also, the claw 59 of the positioning member 56 shifts from one tooth of the template 57 to another. In this case, since the feed of carriage 1 is slightly different from the pitch of the teeth of template 57, the claw 59 is positioned at the bottom of the teeth, not on the head of the teeth. Under this condition, when member 32 is returned the swing member 35 is restored to its original position by means of the coil spring of adjusting screw 51 and coil spring 39. At this time since the clutch is still engaged, the pinion 41 rotates in the reverse direction and carriage 1 is also returned. Thus, the claw arrives at a correct pitch position and stops there. At this time, the clutch of the clutch/brake mechanism 33 is disengaged by operation of the timing cams 22, 23 and the brake simultaneously actuates. As a result, the carriage 1 is locked in that position and fed toward the cutting blade 10 by means of cam face 20a of the transverse feed cam 20 to cut one saw tooth. After this cutting, the clutch is engaged again and member 32 is moved toward roller 36.

According to the operation mentioned above, saw teeth of a blade can be continuously cut by using the template 57. FIG. 3 shows reshaping of the saw teeth in which the saw teeth b of saw blade a are used instead of template 57. Here, the positioning member 60 is employed. Member 60 is engaged by a saw tooth just ahead of the tooth to be reshaped by the cutting blade 10. Similar to the above description, the saw blade can be accurately fed by means of positioning member 60 which profiles the already shaped saw teeth by backward movement of the longitudinal feed mechanism.

It is therefore to be understood that various modifications and changes in the construction and arrangement of parts and sequence of steps employed in the preferred form of invention may be made without departing from the spirit and scope of the present invention as defined by the appended claims.

I claim:

1. In the method of forming saw teeth in a saw blade which is mounted on a carriage in confronting relation to a rotatable cutter member wherein a pattern is formed on said carriage of the teeth to be cut in said saw blade, an edge portion to be toothed on said saw blade is advanced with said carriage in confronting relation to said rotatable cutter member, said carriage is advanced into the path of rotation of said cutter at a predetermined angle of approach to form a first tooth therein followed by successively releasing a locking member on said carriage and longitudinally advancing said carriage a predetermined distance until said saw blade is aligned for cutting of each next tooth in succession and, in succession, said carriage is again advanced into the path of rotation of said cutter to form each tooth in succession, the improvement comprising:

thereafter repeating the steps of releasing said locking member, longitudinally advancing said carriage for a predetermined distance, positioning said locking member in locking relation to a tooth to be formed on said pattern and transversely advancing said carriage to form each next tooth in succession, and gradually increasing said angle of approach in correlation with the longitudinal and transverse movement of said carriage between the formation of each successive tooth.

2. In apparatus for profile-forming saw teeth wherein a carriage on which a saw blade to be cut or toothed is fixed is fed longitudinally and transversely with respect to a cutter blade, the improvement comprising:

a carriage rotatable horizontally about a cutting position of said cutter blade as a center of rotation, and tooth angle changing means associated with said carriage to advance said cutter blade to a predetermined angle at each feeding operation.

3. In an apparatus according to claim 2, said tooth angle changing means operative to change the angle of said cutter blade in coordination with the longitudinal and transverse movement of said carriage.

* * * * *